United States Patent [19]

Hetherington et al.

[11] 4,193,546
[45] Mar. 18, 1980

[54] HIGH-VISCOSITY VOLUME BALANCING MIXING HEAD

[75] Inventors: Robert D. Hetherington, Sunland; David W. Goelz, Burbank, both of Calif.

[73] Assignee: Poly-Glas Systems, Sun Valley, Calif.

[21] Appl. No.: 834,037

[22] Filed: Sep. 19, 1977

[51] Int. Cl.$^2$ .............................................. B05B 15/02
[52] U.S. Cl. ..................................... 239/112; 239/125
[58] Field of Search ............... 239/112, 115, 116, 117, 239/118, 124, 125, 126, 127, 414, 415, 527, 528; 222/145, 135, 148

[56] References Cited

U.S. PATENT DOCUMENTS

| | | | |
|---|---|---|---|
| 3,240,432 | 3/1966 | Boettler | 239/112 |
| 3,249,304 | 5/1966 | Faro et al. | 239/112 |
| 3,504,855 | 4/1970 | Volker | 239/125 |
| 3,690,556 | 9/1972 | McCain | 239/112 |
| 3,873,023 | 3/1975 | Moss et al. | 239/112 |

*Primary Examiner*—James B. Marbert
*Attorney, Agent, or Firm*—Jessup & Beecher

[57] ABSTRACT

A dispensing gun for mixing, then pouring or spraying reactive components, many of which have high viscosity. The gun consists of a material or mixing head or body having a plurality of chambers or canals connecting input ports through passageways and valves in close coupled relationship to a mixing chamber. Valves for purging or flushing the mixer body are also closely coupled to the input parts and mixing chamber. A rotatable mixing grid and mixing sleeve are removably retained in the mixing chamber and can be easily removed for adapting the gun for use with a static or motionless mixer. A high torque pneumatic motor located on the mixer center line drives the mixer grid in the mixing chamber. The mixer body has three or more material inlets, four valves, and a connection for the pneumatic motor all closely coupled to the mixing chamber. The arrangement of valves and pneumatic motor connections permits the device to be easily adapted for completely automatic operation. The trigger for the gun provides built-in lead and lag adjustments for materials having different viscosities and/or pressures. The purging system provides a connection for a coaxial hose, permitting air and/or solvent flushing of the entire mixing gun body. The nozzle is easily replaceable to permit pour or spray configuration.

18 Claims, 14 Drawing Figures

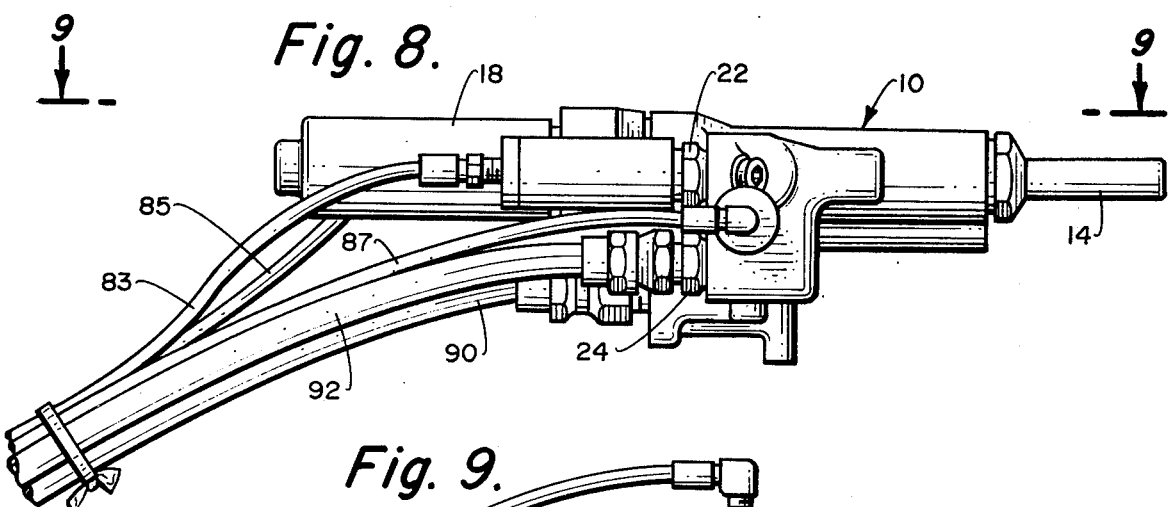
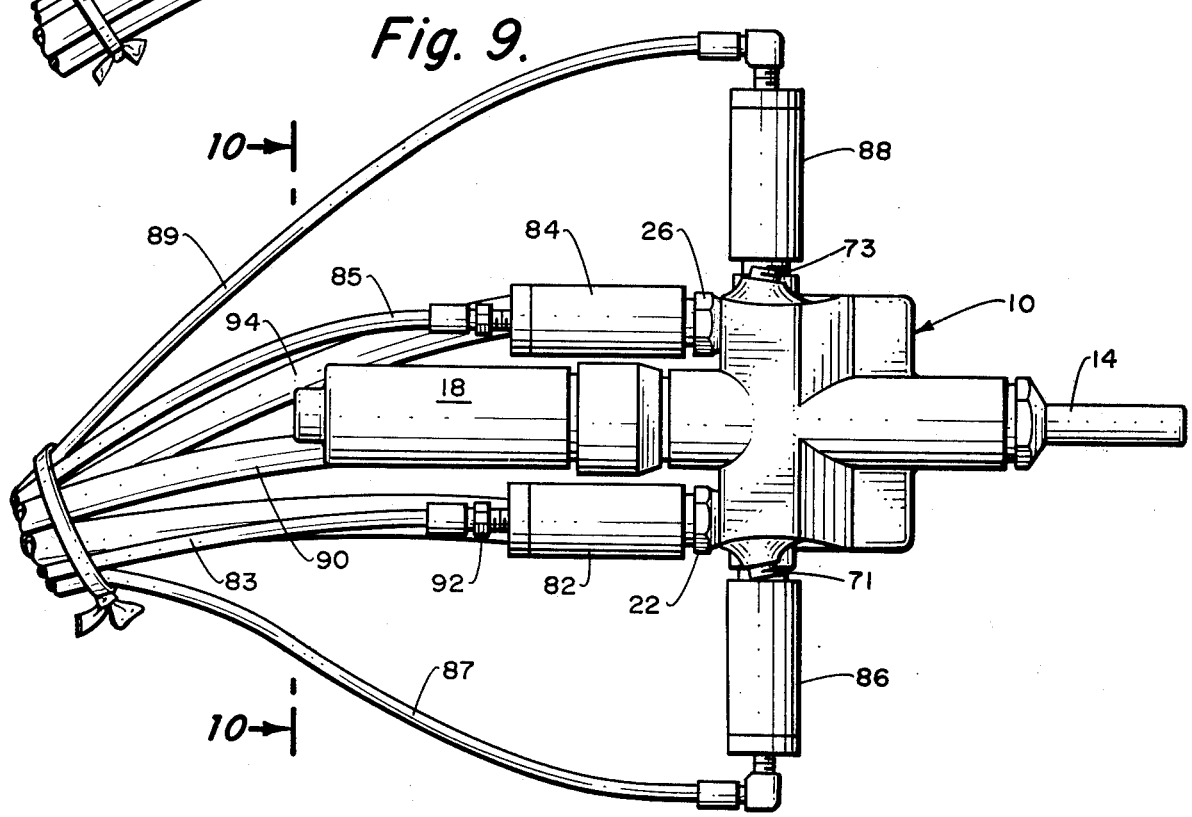
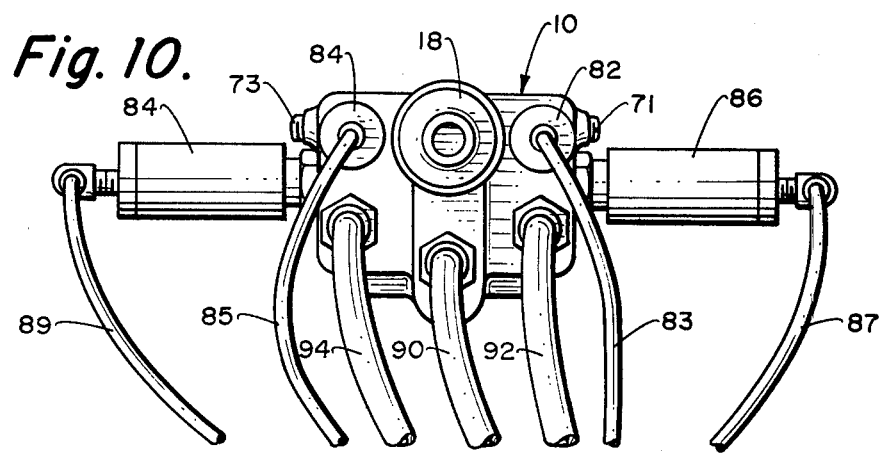

HIGH-VISCOSITY VOLUME BALANCING MIXING HEAD

BACKGROUND OF THE INVENTION

This invention relates to pour and/or spray guns for dispensing a plurality of components and more particularly relates to pour or spray guns for mixing and dispensing reactive components of high viscosity, and/or conveying pressures.

The use of high viscose materials, such as polymeric resins has come into greater use due to the problems of run off from conventional urethane adhesives. Since the consistency of these materials is rather dense, it has been necessary to provide some method of mixing them and then applying them through a dispenser to the workpiece. For light viscosity materials or adhesives the dispenser is in the form of a spray gun, also known as a mixing gun. For the heavier materials the dispenser may be provided with a rotating mixer much like that disclosed in U.S. Pat. No. 3,795,364. In this device the two highly viscose materials are delivered to a chamber and thoroughly mixed by a motor-driven grid. Among the problems with these devices is the difference in volumetric flow because the materials used are not always of the same viscosity and pressure. Thus, one will have a flow rate slightly slower or faster than the other, creating a lead or lag problem resulting in considerable waste caused by frequent start-stop operation. Other problems occurring relate to the cleaning or flushing out of the gun when it is not in use. Frequently, with prior art guns, it has been found quite difficult to clean or flush them because of their complex construction. The patent referred to above solves some of these problems by providing a mixing head which eliminates all valves to prevent clogging or jamming and the consequent difficulties of cleaning and flushing the device. The latter device, while satisfactory for some purposes, lacks versatility because while two highly viscose materials may be easily mixed, the control of the flow of these materials is provided at the source. Because the source or container in which the materials are stored may sometimes be a great distance from the gun or mixing head, considerable waste can result because of the lead or lag time between the two fluids when the device is operated. Further, since there are no valves present in the device described in the patent referred to above, it does not lend itself readily to frequent stop-start, hand-held use, since operation is begun or stopped by activating or deactivating the pumping means on the storage containers.

SUMMARY OF THE INVENTION

The purpose of the present invention is to provide a gun for controlling the mixing, pouring and/or spraying of reactive materials, some of which may be highly viscose, while eliminating waste and providing versatility.

The present invention is comprised of a gun having a mixing body or head which provides unique close coupling of input ports and valves to the mixing chamber. In addition, the design of the mixing head permits center-line mounting of a pneumatically-operated mixing motor providing a good balance of the gun for handheld use. The valve arrangement also allows for adjustment of the flow of the materials to balance them volumetrically and eliminate lead and lag time, thus reducing waste. Additionally, the mixing chamber is provided with a readily removable mixing grid and sleeve for adapting the device for motionless or static mixing as well as accommodating spraying accessories. The arrangement of the valving in the mixing body or head permits conversion to complete automatic operation with relative ease. Delivery of materials and components to the mixing chamber for mixing, cleaning, or flushing is made simple by the close arrangement of valves and passageways to the mixing chamber from hoses coupling the head to the source.

The mixing body has a mixing chamber connected by a passageway or canal to plunger-actuated valves on the same plane and on opposite sides of the center line of the mixing chamber. These valves connect the mixing chamber to input ports directly below the valves. The valve plungers are operated by a trigger-mounted yoke pivotally connected to a handle for hand-held use. The yoke has adjustable hammers or contacts for operating the plungers simultaneously or with a slight displacement to compensate for any lead or lag time of the two components. A coaxial hose connector is provided in a third input port for delivering air and/or solvent for purging the mixing body or head. Valves for the flushing or purging process control the flow of cleaning materials through passageways leading from the third input port to the component passageways. The flushing or purging flow control valves 30, 32 (FIG. 6) are outboard on either side of the mixing body permitting separate, manual or automated operation from the material flow control valves. This outboard mounting and configuration eliminates any possible interference with operation of the hoses and material flow control valves.

It is one object of the present invention to provide a mixing gun body having closely coupled valving for materials and components to the mixing chamber.

Another object of the present invention is to provide a mixing gun body having a valve arrangement for adjustment of lead and lag time for reactive components.

Another object of the present invention is to provide a mixing gun body which can be easily converted from manual operation to automatic operation.

Still another object of the present invention is to provide a mixing gun body having material flow control valves which also provide a method for rapidly flushing the passageways without disassembling the apparatus.

Still another object of the present invention is to provide a mixing gun body in which a plurality of valves and passageways can be compactly arranged and closely coupled to the mixing chamber.

Yet another object of the present invention is to provide a mixing gun head designed to minimize pressure drop to permit relatively high output of high viscose compounds.

Still another object of the present invention is to provide a mixing gun head having an in-line centered pneumatic drive motor for a rotatable mixing grid to provide excellent gun balance for increasing maneuverability.

Other objects, advantages and novel features of the invention will become apparent from the following detailed description of the invention when considered in conjunction with the accompanying drawings wherein like reference numbers identify like parts throughout.

BRIEF DESCRIPTION OF THE DRAWINGS

FIG. 8 is a side elevation of the mixer body converted for automatic operation.

FIG. 9 is a top view of the mixer body of FIG. 8.

FIG. 10 is a rear view of the mixer body of FIG. 8.

DETAILED DESCRIPTION OF THE PREFERRED EMBODIMENT

Figure 1:
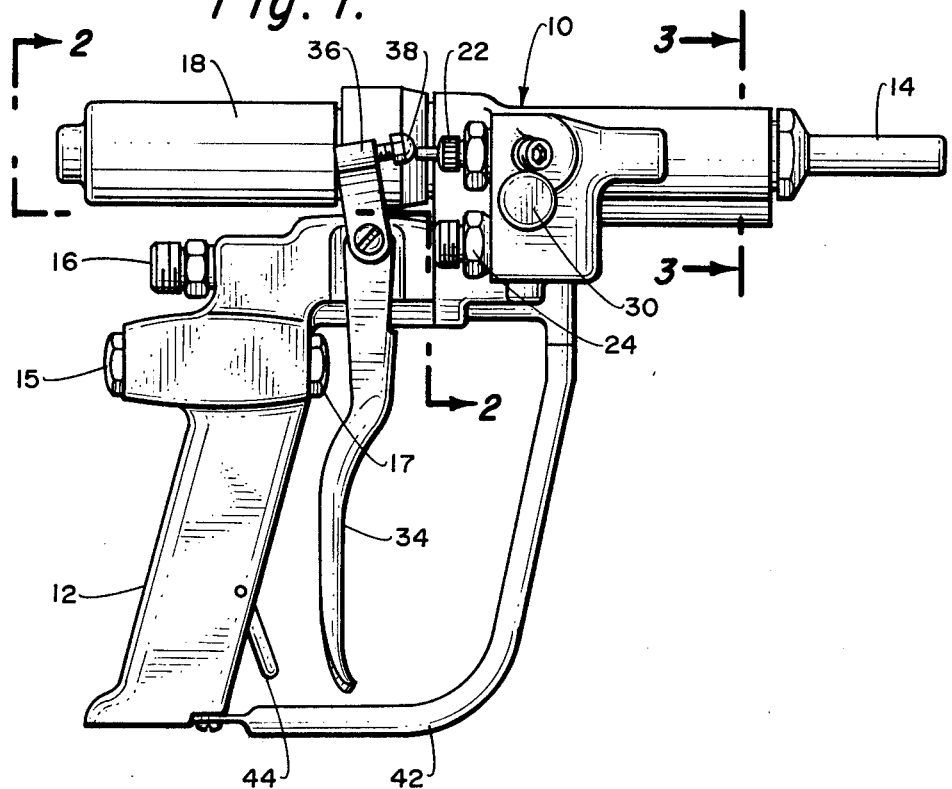
FIG. 1 is a side elevation of the mixing gun assembled for manual operation.
Figure 7:
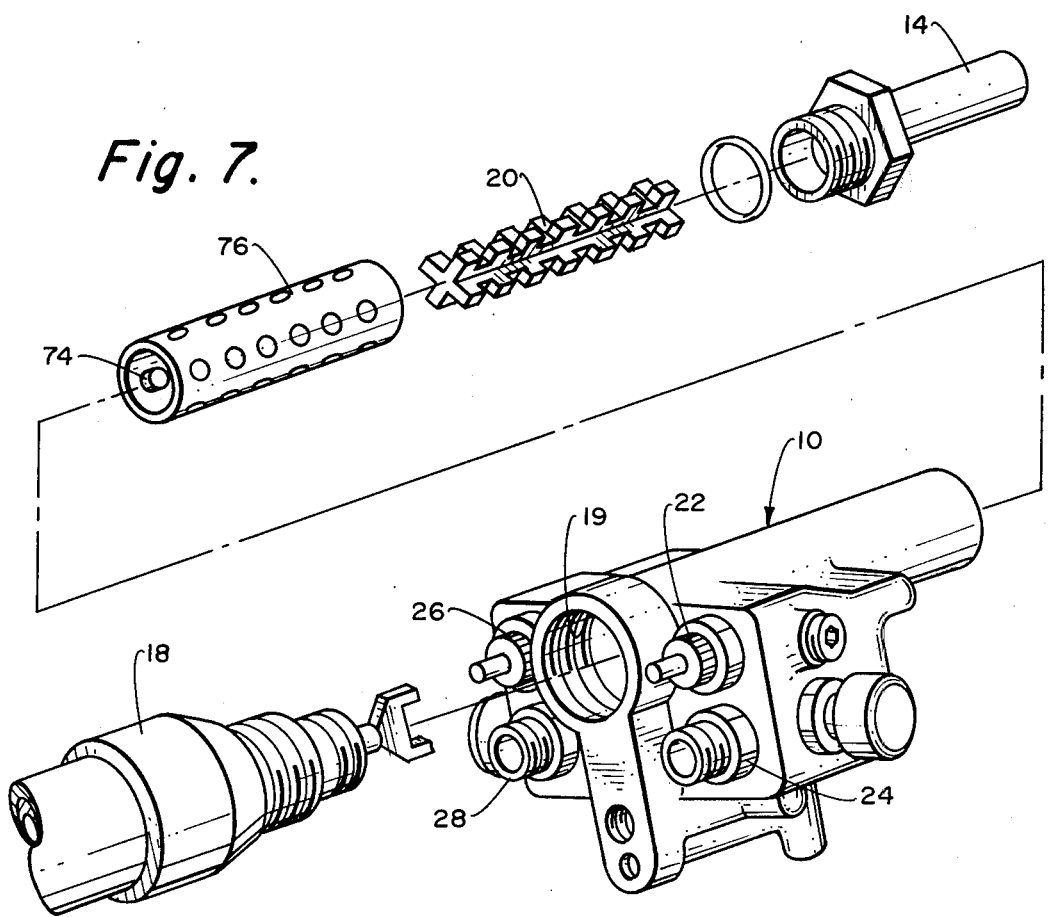
FIG. 7 is an exploded view of the mixing gun body mixer assembly.

A mixer gun designed for use with highly viscose components is illustrated in FIG. 1 having a gun body 10 connected to a handle 12 for manual operation. A pour nozzle 14 is connected to the output port of the mixing body 10. The handle 12 is secured to the gun body 10 by an adapter feed tube 16. A pneumatic motor 18 attaches to the rear of the mixer body 10 for driving a mixing grid 20 (FIG. 7). A reaction component valve 22 controls the flow of a reaction component delivered to an input port through hose connector 24. The valve and connector are symmetrically located with respect to a second valve 26 and component hose connector 28, shown in FIG. 2. Purge or flushing system valves are operated by pushbuttons 30 and 32 for cleaning the material flow control valves 22 and 26 and the mixing body passageways.

Figure 2:
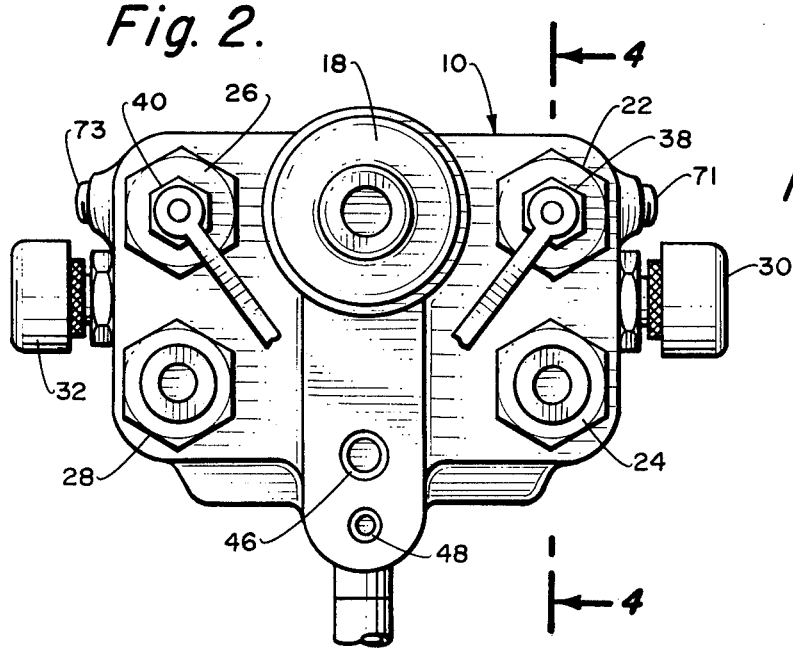
FIG. 2 is a view taken at 2—2 of FIG. 1 illustrating the mixing gun head with the handle removed.
Figure 3:
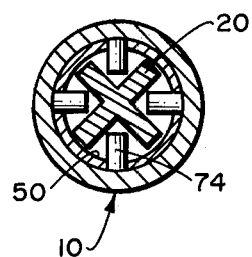
FIG. 3 is a sectional view taken at 3—3 of FIG. 1.

The gun is operated by a trigger 34 connected to a yoke 36 having adjustable hammers or contacts 38 and 40 for operating the respective flow control valves 22 and 26. The trigger 34 is protected by a trigger guard 42 and may be locked off with trigger locking pin 44. The locking pin 44 engages the trigger, preventing it from being operated. The air/solvent fitting or feed tube 16 secures the handle 12 to the body 10 by screwing into a port 46 (FIG. 2). Alignment of the handle 12 with the body 12 is provided by a dowel-receiving hole 48.

Figure 4:
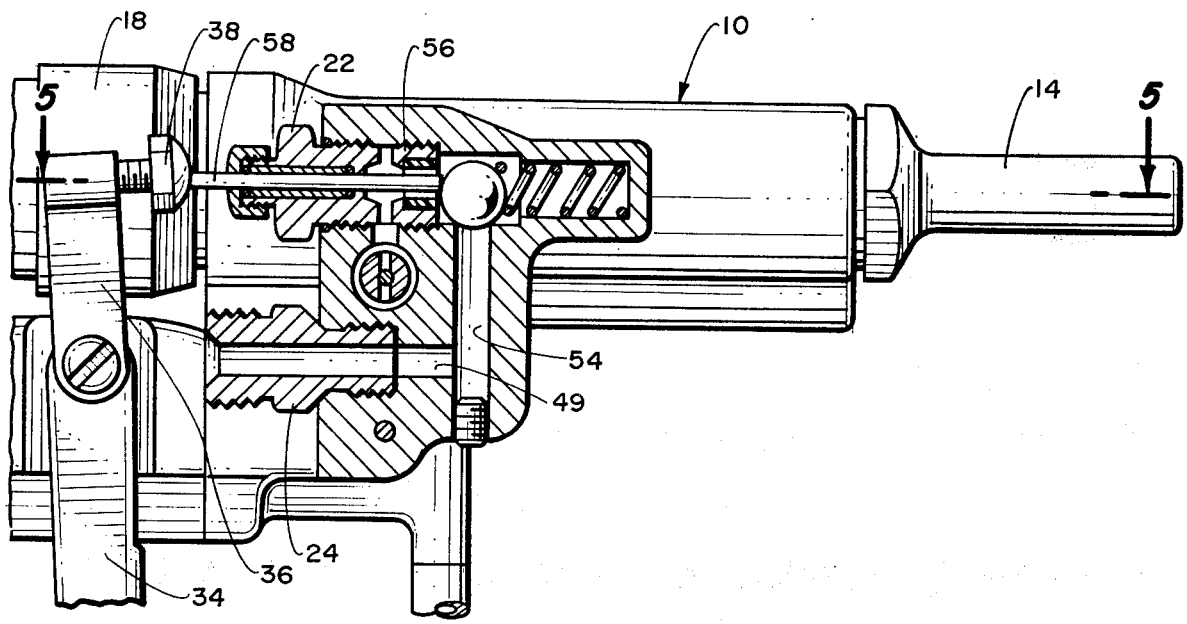
FIG. 4 is a sectional view taken at 4—4 of FIG. 2.
Figure 5:
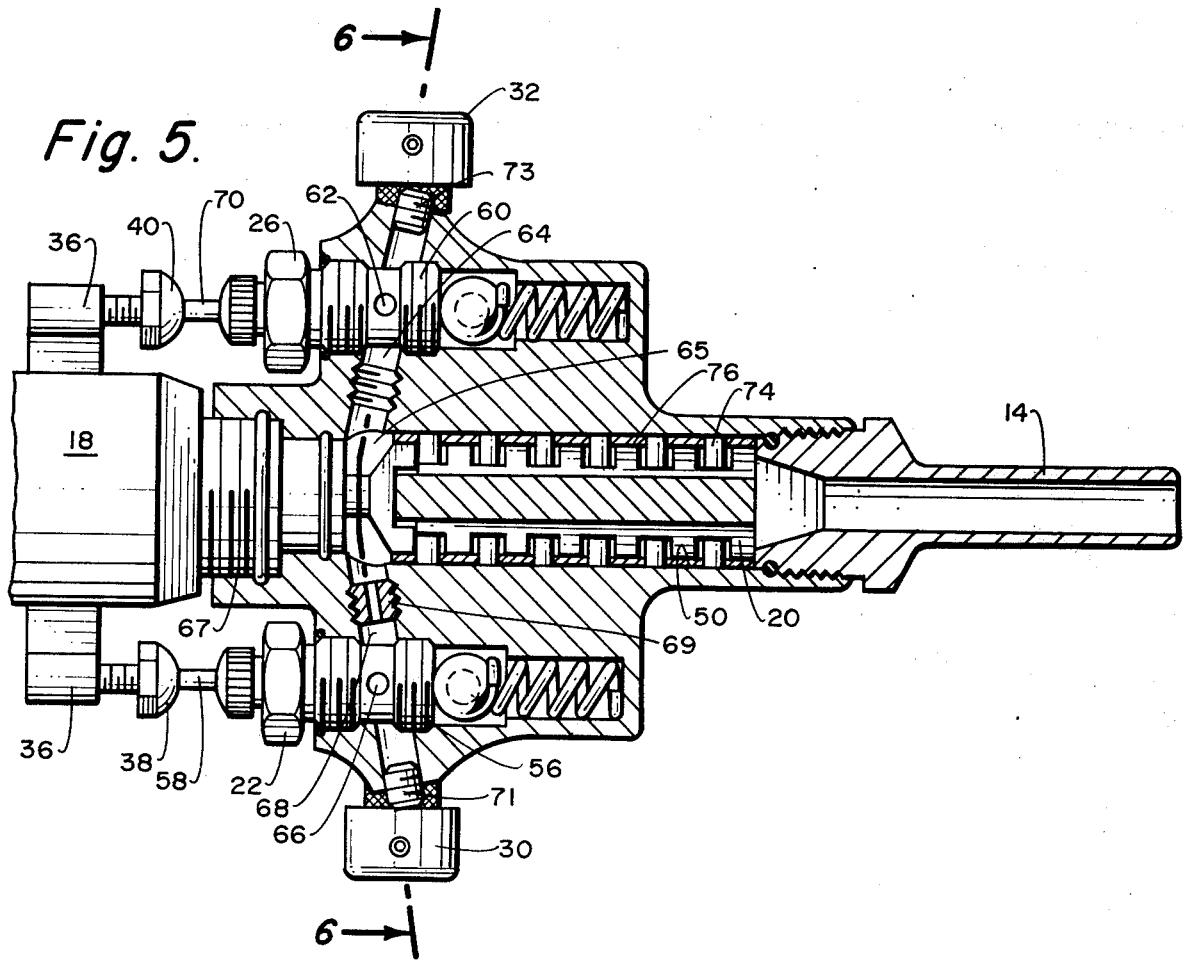
FIG. 5 is a sectional view taken at 5—5 of FIG. 4.
Figure 6:
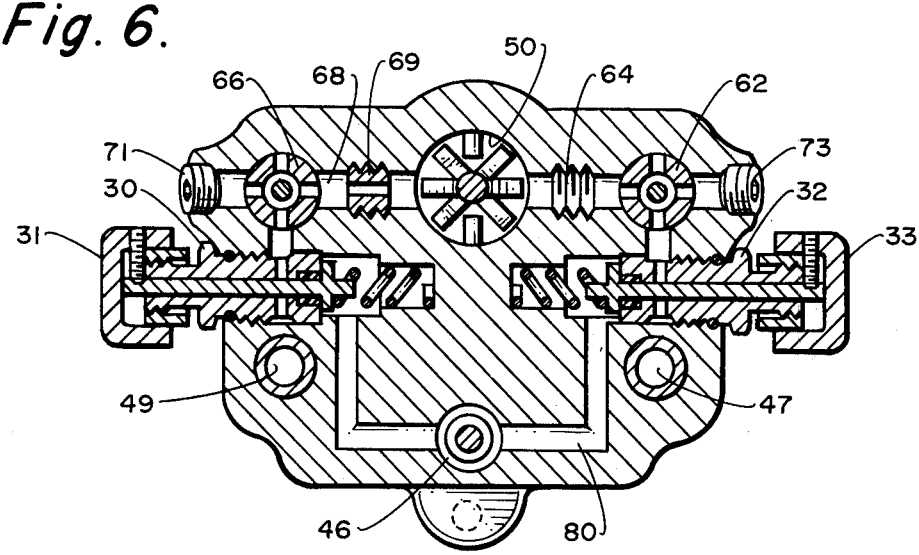
FIG. 6 is a sectional view of the mixing gun body taken at 6—6 of FIG. 5.

The arrangements of the canals or passageways for delivery of the reactive materials and air solvent are illustrated in sectional views of FIGS. 4 through 6. The passageways for delivery of the materials are identical and symmetrically located about a mixing chamber 50 for simultaneously delivering the two components for mixing and dispersement through the pour nozzle 14. One component is delivered through connector 24 to input port 49 and passageway 54, connecting the input to valve 56 operated by a plunger 58. An identical passageway or delivery system is provided on the opposite side of mixing chamber 50 as shown in FIG. 5. The second component would be delivered through valve 60 and port 62 to passageway 64 having counterparts 56, 66 and 68 on the opposite side. Component passageways 64 and 68 intersect entrance passageway 65 to mixing chamber 50 at approximately right angles. Plunger 70 operates the valve 60 to control the flow of the second reactive component.

The two components are combined in mixing chamber 50 by a rotating grid 20 being driven by a fork 72 engaging the grid as shown in FIG. 5. The fork 72 is driven by a pneumatic air motor 18 secured in threaded bore 67. The mixing is produced by the grid 20 meshing with posts or pins 74 in a sleeve 76 inserted in the mixing chamber 50.

The system for flushing or purging the mixer body 10 is illustrated in FIG. 6, showing the air/solvent input port 46 joined to valves 30 and 32 by passageways 78 and 80. The air/solvent valves 30, 32 intersect 78, 80 immediately adjacent and at right angles to the component material valves 56, 60. Operation of valves 30 or 32 simultaneously or independently causes air and/or solvent to pass through ports 62, 66 of valves 56 and 60 into the mixing chamber 50, cleaning the gun body. When valves 30 and 32 are open, a path through the body is provided from the air solvent port 46 through passageway 78, 80, through the valves and through port 62 and 66 of valves 56 and 60 into passageways 64 and 68 out through mixing chamber 50.

The gun body can be used in manual operation with the handle 12 attached. In manual operation valves 56 and 60 are operated by yoke 36 through trigger 34. Pushbutton purging is provided by buttons 31, 30 operating air/solvent valves 30 and 32 respectively. In order to adjust the volumetric flow as well as the lead and lag time, hammers or contacts 38 and 40 are adjustably mounted in yoke 36. By screwing the contacts 38 or 40, into the yoke, they can be made to contact the plungers 58 or 70 earlier or later in order to adjust the amount of flow as well as the lead and lag time caused by different viscosities of reactive components.

The mixing portion of the gun is provided by the grid 20 intermeshing with the posts 74 of the sleeve 76 which fits into the mixing chamber 50. The sleeve has four rows of pins 74 equally spaced around the periphery of the sleeve 76 and spaced along the length so that they intermesh between the spokes of the grid 20. The nozzle 14 is easily removed for replacement by different shapes and configurations of nozzles as well as permitting the grid and sleeve to be easily disassembled for repair or reconditioning.

In operation, a source of two reactive components is connected by hoses to connections or input ports 24 and 28. With air motor 18 driving grid 20 in mixing chamber 50, actuation of the trigger 34 permits the two components to flow through passageway 49 into passageway 54 by ball valve 56 into passageways 64 and 68 and for mixing in the mixing chamber 50, which then dispenses the mixed reactive component(s) from the pour nozzle 14. As was described above, the volume of each component and lead and lag can be easily adjusted by adjusting contacts or hammers 38 and 40. After use, the valves 22 and 26, passageways 64 and 68, and mixing chamber can be purged of materials by operation of valves 30 and 32, allowing the gun body 10 to be flushed with a solvent and/or air. Close coupling of component material passageways 49 to 54, 64 and 68, mixing chamber 50 and air solvent purge system passageways 78 and 80, minimizes waste by minimizing lead or lag time for delivery of components to the mixing chamber 50.

In the event that the adjustment in the operation of valves 22 and 26 is not sufficient to eliminate the lead/lag between the two components, the mixer body is adapted for the addition of an auxiliary orifice jet or restriction. This is done by providing threads in passageways 64 and 68, allowing insertion of an auxiliary jet 69, in the path of either of the two components to be mixed. The auxiliary orifice would be inserted by removal of plug 71 and valve 22, allowing access to the threads in passageway 68. Only one auxiliary jet would be needed with the threads being provided in both passageways 64 and 68, permitting the auxiliary jet to be added to further restrict the flow of whichever component is selected. The auxiliary jet 69 may be added to the opposite side in the same fashion by removal of plug 73, providing access to canal 64. Thus, if after adjustment of control of the two valves 22 and 26 there is still some lead by one of the components, the auxiliary jet 69 can then be added to the pathway of that component providing even greater control. The threaded passageway permits insertion of a replaceable orifice or restriction 69 of selected sizes to create back pressure from one component relative to the other. Thus, control over a wide range of lead/lag or differential pressures can be provided for.

Removal of nozzle 14, mixing grid 20, air motor 18, and sleeve 76 not only permits complete flow-through access to the mixing chamber, but allows conversion of the mixer body 10 to other configurations. Threaded bore 19 may be plugged and a passive mixer installed in place of nozzle 14. In addition, a variety of nozzles may be used, such as a nozzle which provides or adds spraying or frothing capabilities.

For automatic operation the mixer body 10 may be used independently of the handle 12, or any manual operating system. As shown in FIGS. 8 through 10, the handle and trigger are replaced with solenoids 82, 84 attached directly over the valves 22 and 26. Likewise, the buttons 31 and 33 are replaced with solenoids 86, 88 for automatic operation of the cleaning or purge system. Thus, the mixing body is unique in that it can be used by itself with a manual system or with an automatic system with each separately and independently connected to dispense a mixed reactive adhesive. Another variation would be to leave the cleaning or purge system valves and pushbuttons 31, 33 on, permitting a semi-automatic operation. Solenoids 82, 84, 86, 88 may be electric or pneumatic and are connected by hose/cables 83, 85, 87, 89, respectively. Materials are supplied through hoses 92 and 94, while air/solvent supply is provided by coaxial hose 90. The versatility and adaptability of the mixing gun body 10 for adaptation of different nozzles as well as manual, semi-automatic and automatic operation is virtually unlimited.

Figure 11:
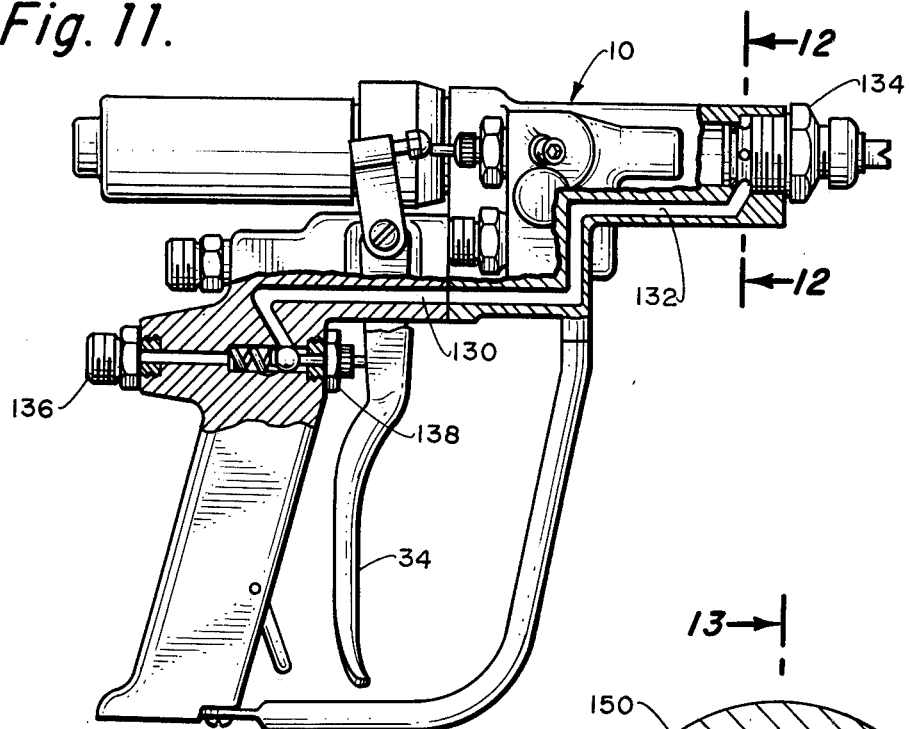
FIG. 11 is a side elevation of the mixing gun in partial section as modified for air atomizing of components.
Figure 12:
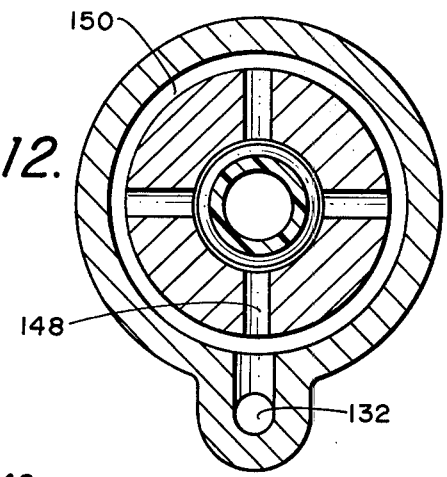
FIG. 12 is a sectional view taken at 12—12 of FIG. 11.
Figure 13:
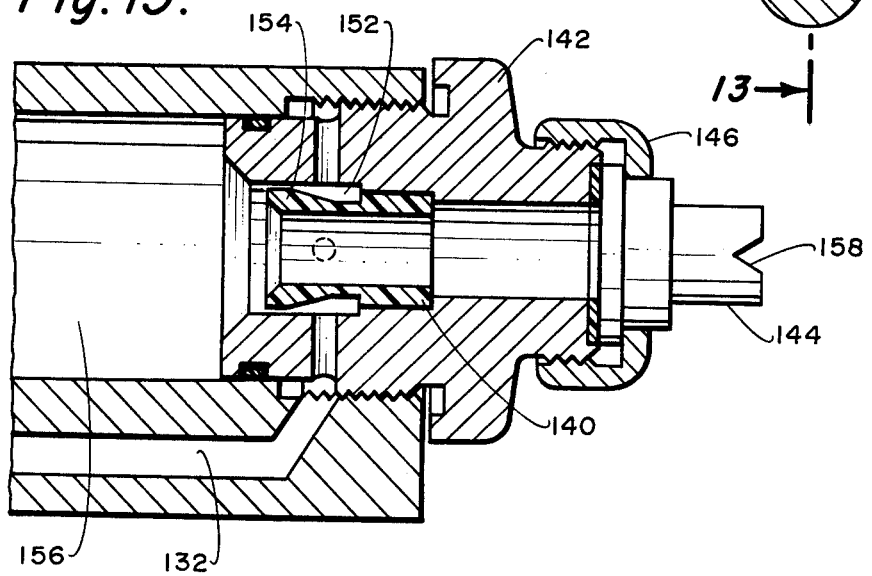
FIG. 13 is a sectional view taken at 13—13 of FIG. 12.

Air atomizing of the components for spray application can also be provided as illustrated in FIGS. 11 through 13. In this embodiment a passageway 130 is provided in the gun handle communicating with a passageway 132 in the gun body, which exists adjacent to an air atomizing nozzle 134, illustrated more clearly in FIGS. 12 and 13. A threaded nipple 136 is provided for attachment of an air hose (not shown). The air is controlled by a valve 138 simultaneously operated by the trigger 34, permitting air to flow from the nipple 136 through passageways 130 and 132 to the air atomizing nozzle assembly 134.

The air atomizing nozzle assembly 134 is comprised of an air-deflecting insert 140 fitting the nozzle body 142 which has a V-jet 144 secured by a clamping nut 146. The nozzle body 142 has apertures 148 communicating with the passageway 132 by a circumferential passageway 150. Air admitted into the passageway 132 thus flows around the nozzle body 142 into the gap 152 surrounding the conical portion 154 of the insert 140. The air is then forced into the area 156 against the flow of the mixed components atomizing them for a fan-type spray out of the V-jet 144. Thus, the gun body 10 is adaptable from a component mixing and pour configuration of FIG. 1 to an air atomizing configuration of FIGS. 11 through 13 by removal of the plugs 15 and 17 and addition of the nipple 136 and valve 138, for attachment of pressurized air. The pour spout or nozzle 14 is also replaced by the air atomizing or spraying nozzle assembly 134.

Figure 14:
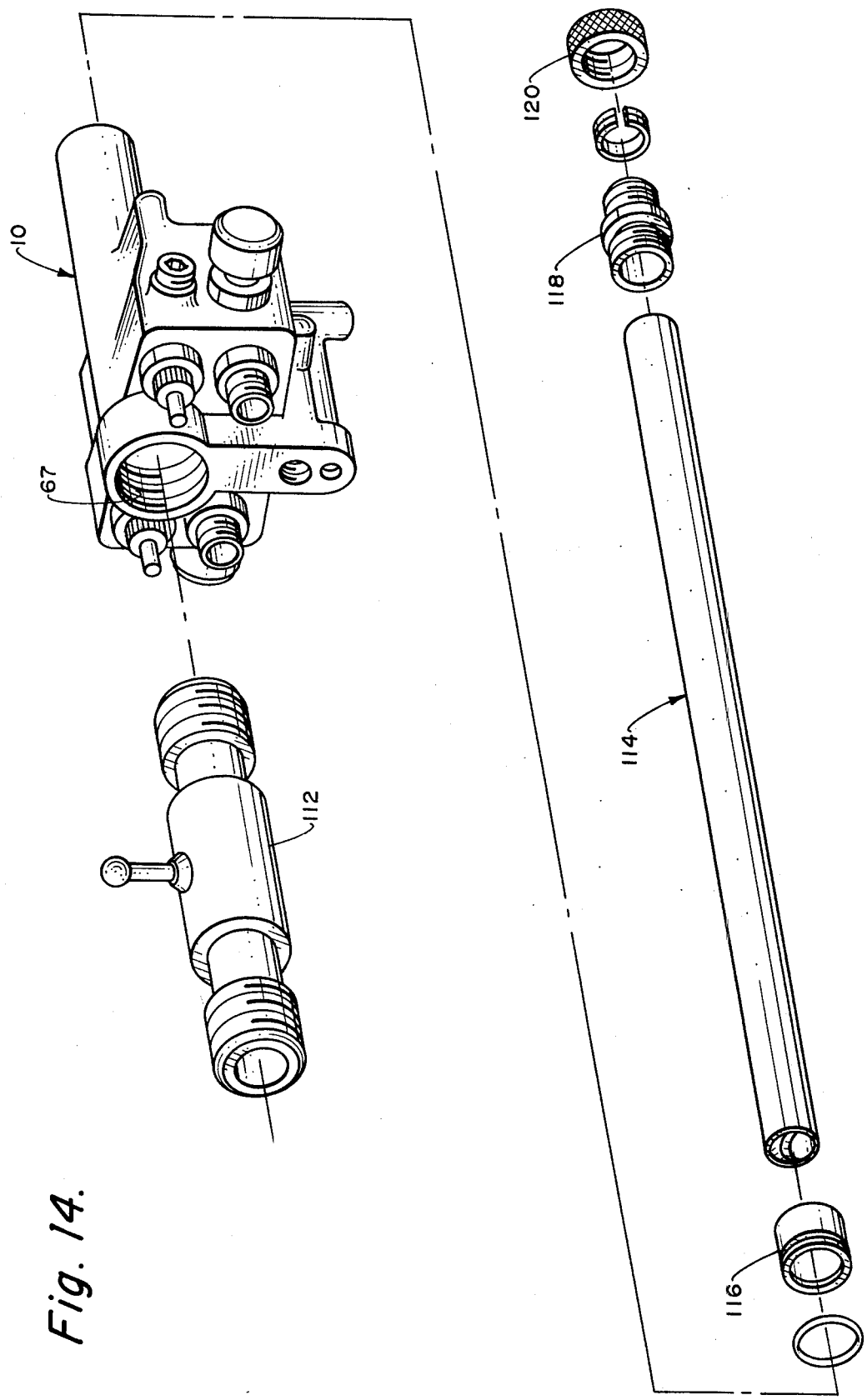
FIG. 14 is an exploded view illustrating conversion of the mixer gun body for use with a frothing or foaming agent.

The versatility of the gun body is further illustrated in FIG. 14 in which the gun body 10 is converted for use with a frothing or foaming agent for pre-expansion. Foaming agents are added to the two-component mixture to provide a low-density pre-expanded foam when desired. This is accomplished by adding a toggle switch control valve 112 which is in place of the pneumatic motor 18. The nozzle and mixing grids are also removed from the gun body 10 and a motionless mixer 114 added, which has an internal spiral flange for static mixing of the two pre-expanded components. The motionless mixer 114 replaces the original pour nozzle 14 and has adapters 116, 118 and 124 securing the mixer to the gun body 10.

The co-polymer gun can also be used with a motionless mixer 114 without the foaming agent by adding a plug in the threaded hole 67 in place of the motor 18 or the foaming agent control switch 112.

Obviously, many modifications and variations of the present invention are possible in light of the above teachings. It is therefore to be understood that the full scope of the invention is not limited to the details disclosed herein and may be practiced otherwise than as specifically described.

What is claimed is:
1. An apparatus for mixing and dispensing a plurality of reactive components comprising:
 a body;
 a mixing chamber in said body having an inlet and exit ports;
 a nozzle secured in said exit port;
 a pair of component inlet ports in said body;
 a pair of passageways intersecting at the inlet to said mixing chamber connecting said inlet ports to said mixing chamber;
 a pair of valves in said passageways near said intersection of said passageways for controlling the flow of material to said mixing chamber;
 means to connect component supply hoses directly to said body through said inlet ports, whereby the reactive components are closely coupled to said pair of valves and said mixing chamber;
 a third inlet port;
 a third passageway connecting said third inlet port to said first pair of passageways intermediate said pair of inlet ports and said mixing chamber; and
 valve means in said third passageway whereby said body may be flushed with cleaning materials after use.
2. The apparatus according to claim 1 wherein, said pair of passageways intersect opposite sides of the entrance to the mixing chamber at approximately right angles; and said pair of valves are positioned a short distance downstream from said intersecting point.

3. The apparatus according to claim 1 wherein said third passageway branches into a pair of passageways intersecting the first pair of passageways at the first pair of valves whereby cleaning materials pass through said valves during flushing of said body.

4. The apparatus according to claim 3 wherein said valve means in said third passageway comprise:

a second pair of valves in said third passageway branch, each of said pair of valves being positioned in said passageway branches immediately adjacent to the intersecting point of said first pair of passageways.

5. The apparatus according to claim 4 wherein said first pair of valves and said second pair of valves are at approximately right angles to each other whereby the valves may each be operated independently without interfering with one another.

6. The apparatus according to claim 1 including:

a handle connected to said body, trigger means pivotally mounted on said handle, contact means on said trigger means for operating both of said pair of valves when said trigger is activated.

7. The apparatus according to claim 6 including, control adjusting means on said trigger for adjusting the lead, lag and volumetric flow of said valves.

8. The apparatus according to claim 7 wherein said control adjusting means comprises means for adjusting the position of the contact means on said trigger.

9. The apparatus according to claim 8 wherein said handle is connected to said body by a feed tube threadably engaging said third inlet port.

10. The apparatus according to claim 2 including, a rotatable mixing grid in said mixing chamber, a mixing sleeve in said mixing chamber having fixed pins intermeshing with the mixing grid, drive means attached to said body coincident with the axis of said mixing chamber for rotatably driving said mixing grid.

11. The apparatus according to claim 10 including a threaded bore terminating in the entrance passageway to said mixing chamber, said drive means being secured in said threaded bore and having fork means passing through the entrance passageway and engaging the mixing grid.

12. The apparatus according to claim 10 wherein said mixing grid and mixing sleeve are held in said mixing chamber by said nozzle.

13. The apparatus according to claim 1 including:

adapter means adapting said body for addition of at least one auxiliary orifice between one of said pair of inlet ports and said mixing chamber.

14. The apparatus according to claim 13 wherein said adapter means comprises:

threads in said pair of passageways between said pair of valves and the inlet end of the mixing chamber.

15. The apparatus according to claim 1 including:

a fourth passageway in said body intersecting said pair of passageways at the inlet to said mixing chamber, connecting means for connecting a foaming agent to said fourth passageway whereby said reactive components may be pre-expanded.

16. The apparatus according to claim 1 including:

an air passageway in said body terminating adjacent to the exit port of said mixing chamber.

17. The apparatus according to claim 16 wherein said nozzle comprises:

a spray nozzle secured in said exit port, deflecting means in said spray nozzle for deflecting air from said air passageway against the flow of the mixed components for delivering a uniform spray from said nozzle.

18. The apparatus according to claim 17 wherein said deflecting means comprises a tapered insert in said nozzle tapering outward from said air passageway toward said mixing chamber.

* * * * *